United States Patent
Thurmeier et al.

(10) Patent No.: US 10,150,361 B2
(45) Date of Patent: Dec. 11, 2018

(54) MOTOR VEHICLE AND ENERGY STORAGE DEVICE

(71) Applicant: AUDI AG, Ingolstadt (DE)

(72) Inventors: Markus Thurmeier, Adlkofen (DE); Martin Heer, Kösching (DE); Martin Schüssler, Kösching (DE); Norbert Enning, Denkendorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/725,815

(22) Filed: Oct. 5, 2017

(65) Prior Publication Data
US 2018/0099557 A1 Apr. 12, 2018

(30) Foreign Application Priority Data
Oct. 7, 2016 (DE) .................. 10 2016 219 485

(51) Int. Cl.
| | |
|---|---|
| *B60K 11/06* | (2006.01) |
| *B60K 1/04* | (2006.01) |
| *B60L 11/18* | (2006.01) |
| *B60K 1/00* | (2006.01) |

(52) U.S. Cl.
CPC .............. *B60K 11/06* (2013.01); *B60K 1/04* (2013.01); *B60L 11/1874* (2013.01); *B60K 2001/005* (2013.01); *B60K 2001/0411* (2013.01); *B60L 2240/36* (2013.01)

(58) Field of Classification Search
CPC ........ B60K 2001/003; B60K 2001/005; B60L 11/1874
See application file for complete search history.

(56) References Cited

U.S. PATENT DOCUMENTS

| | | | | |
|---|---|---|---|---|
| 5,082,075 A | * | 1/1992 | Karolek | B60R 16/04 180/68.2 |
| 5,320,190 A | | 6/1994 | Naumann et al. | |
| 5,490,572 A | * | 2/1996 | Tajiri | B60H 1/00278 180/65.1 |
| 5,937,664 A | * | 8/1999 | Matsuno | B60H 1/00278 62/186 |
| 6,152,096 A | * | 11/2000 | Setsuda | B60R 16/04 123/184.21 |
| 6,828,755 B1 | * | 12/2004 | Iverson | H01M 16/00 320/104 |

(Continued)

FOREIGN PATENT DOCUMENTS

| | | |
|---|---|---|
| DE | 4018347 A1 | 12/1991 |
| DE | 10337493 A1 | 4/2004 |

(Continued)

OTHER PUBLICATIONS

Examination Report dated Aug. 9, 2017 of corresponding German application No. 10 2016 219 485.2; 6 pgs.

*Primary Examiner* — Brian L Swenson
(74) *Attorney, Agent, or Firm* — Maier & Maier, PLLC

(57) ABSTRACT

A motor vehicle with an energy storage device with at least one electric energy store and an air conditioning device for an active control of the temperature of the energy store accommodated in a housing. At least one air inlet opening and at least one air outlet opening are provided at the housing, and an ambient air stream can be guided by the air inlet opening into the housing and by the air outlet opening from the housing for passive cooling.

10 Claims, 2 Drawing Sheets

(56) References Cited

U.S. PATENT DOCUMENTS

| | | | | |
|---|---|---|---|---|
| 7,635,040 | B2* | 12/2009 | Seo | B60H 1/00278 |
| | | | | 180/68.1 |
| 8,662,226 | B2* | 3/2014 | Varns | B60H 1/00014 |
| | | | | 135/42 |
| 8,701,811 | B2* | 4/2014 | Robinson | B60K 11/06 |
| | | | | 180/68.2 |
| 9,312,549 | B2* | 4/2016 | Tachibana | B60K 11/06 |
| 9,583,801 | B2* | 2/2017 | Steinmeyer | H01M 10/625 |
| 9,677,517 | B2* | 6/2017 | Roten | F02M 35/161 |
| 9,878,591 | B2* | 1/2018 | Taniguchi | B60H 1/00278 |
| 2004/0065491 | A1* | 4/2004 | Dudley | B60R 16/04 |
| | | | | 180/68.5 |
| 2004/0194489 | A1* | 10/2004 | Pode | B60H 1/00278 |
| | | | | 62/259.2 |
| 2009/0071178 | A1* | 3/2009 | Major | B60H 1/00278 |
| | | | | 62/239 |
| 2009/0277707 | A1* | 11/2009 | Ballard | B60K 1/00 |
| | | | | 180/68.2 |

FOREIGN PATENT DOCUMENTS

| | | |
|---|---|---|
| DE | 102008034887 A1 | 6/2009 |
| DE | 102011089489 A1 | 6/2013 |
| DE | 102013216104 A1 | 2/2015 |

* cited by examiner

MOTOR VEHICLE AND ENERGY STORAGE DEVICE

FIELD

The invention relates to a motor vehicle comprising an energy storage device and at least one electric energy store and an air conditioning device for actively controlling the temperature of the energy store, wherein the energy store is accommodated in a housing. In addition, it relates to an energy store.

BACKGROUND

Sufficiently dimensioned energy devices, which are often called "high-voltage batteries", are required for motor vehicles that are provided with an electric drive, or so-called electric vehicles. In such an energy storage device are typically connected in series a plurality of energy stores installed in a housing. Corresponding housing units for energy storage devices are known and they are used in general for the accommodation of the individual energy store components. The energy store components include in addition to the actual energy store also electric or electronic components which can be connected to the energy store, such as for example charging or controlling electronic components. For this purpose, such a housing is typically provided with an interior that is designed to accommodate the energy store components.

It is known that heat is generated during the operation of the corresponding energy store components, wherein the heat must be dissipated from the energy storage components as well as from the housing that is accommodating these components in order to avoid overheating and the resulting potential damage from being caused to the energy store components.

The use of a separate air conditioning device that is connected to a corresponding housing makes it possible to provide cooling or temperature regulation of the corresponding energy store components. However, a disadvantage of such air conditioning devices is that, in particular as a result of different operating conditions of the motor vehicle, the generation of heat by the energy store or by the charging or control electronics can vary. Therefore, a cooling output of the air conditioning device must be designed in such a way that it is sufficient for example also with a strong acceleration of the motor vehicle and for a correspondingly large energy removal from the energy store and for the resulting strong development of heat in order to regulate the temperature of the energy storage device in such a way that causing damage to the energy store components will be avoided.

DE 10 2008 034 887 A1 describes a cooling apparatus for a battery in a motor vehicle. The cooling apparatus comprises a cooling plate through which a coolant can flow and which is connected to the battery cells in a heat-conductive manner. In addition, an air cooler is used for cooling the battery as required.

DE 10 2011 089 489 A1 discloses a cooling system for cooling an electrical energy store of a motor vehicle, wherein the cooling system is provided with an air intake channel. A stream of air entering through the air intake channel can be adjusted by means of a control valve, which is arranged between an air filter and the energy store.

SUMMARY OF THE DISCLOSURE

The objective of the invention is to provide a vehicle with an energy store which is improved over prior art.

In order to achieve this objective according to the invention with a motor of the type mentioned in the introduction, at least one air inlet opening and at least one air outlet opening is provided at the housing, so that ambient air can flow through the air inlet opening into the housing and out of the housing through the air outlet opening for passive cooling.

According to the invention it is therefore proposed that on the one hand, an air conditioning device is employed, which can comprise for example a fan by means of which an air stream can be generated and this air stream can be cooled in order to actively cool the energy storage device. This can be done for instance when the motor vehicle is for example ready for operation, which is to say in the switched-on state, waiting at a traffic light or moving forward at a speed below a certain predetermined speed. The same applies, however, in the case when the motor vehicle is parked and is for example being charged, because heat can be developed also in this case, which then makes an active temperature control of the energy storage device necessary.

As soon as the motor vehicle is moving at a higher speed, which is for example above a predetermined limiting speed that can be stored in a control device for activating the energy storage device, an ambient air stream caused by the traveling vehicle can be used for passive cooling of the energy storage device. If the ambient air stream is strong enough, for example due to a high speed of the motor vehicle, the cooling output of the ambient air stream that is guided into the housing can be fully sufficient to regulate the energy storage device so that overheating of the energy storage components will not occur.

Therefore, an ambient air stream can be used in certain operating modes of the motor vehicle for passive cooling of the energy storage device, which means that the air conditioning device can be designed with smaller dimensions for active cooling because in particular in situations when a relatively large amount of energy is dissipated from the energy store, the associated heat development of the ambient air stream is sufficient for regulating the temperature of the energy storage device, or at least can contribute to it.

As a result, the manufacturing costs of the energy storage device and thus also of the entire motor vehicle can be lowered and the efficiency of such an energy storage device and of the associated motor vehicle can be improved because the air conditioning apparatus can be provided with smaller dimensions for active cooling. Due to the provided air inlet and air outlet opening, a continuous air stream is created throughout the housing of the energy storage device, so that an air cushion and a heat accumulation associated with it is created in the internal part of the housing. In addition, the temperature control devices provided in the housing, such as for example cooling ribs, may be attached to individual energy storage components in order to ensure heat removal from the energy storage components that is as efficient as possible. Moreover, the air guiding elements can carry out a targeted guidance of the air from the air inlet opening to the air outlet opening.

In a particularly preferred variant of the invention it can be provided that the energy storage device is arranged in the area between the front of the motor vehicle and the passenger compartment so that the ambient air stream that is generated by the traveling vehicle and that is impacting the front of the motor vehicle can be guided through the air inlet opening into the housing. It is thus in accordance with the invention possible to that the energy storage device is arranged so that it is at least partly protected from view by a bumper cover and/or a motor vehicle grille, wherein the ambient air stream can be guided through corresponding openings of the motor vehicle grille directly to the housing of the energy storage device.

Accordingly, it can be provided that with the motor vehicle according to the invention, the air inlet opening is arranged on a side of the housing that is directed toward the front of the motor vehicle and the air outlet opening is arranged on the side of the housing that is oriented toward the rear of the motor vehicle. According to the invention, the ambient air stream can thus be guided as efficiently as possible, without an unnecessary deflection blocking and diverting the air stream, into the housing of the energy storage device. In addition, there is the possibility that the air inlet opening, which is arranged on the side of the housing directed towards the front of the motor vehicle, is arranged so that it is staggered in relation to the air outlet opening that is arranged on the side of the housing directed toward the rear of the vehicle. This means that within the context of the invention, the air inlet and air outlet openings can be arranged in corners of the housing of the energy storage device that are located diagonally opposite each other. As a results, the ambient air stream that is guided into the housing will be guided at least partially through the housing, so that the cooling output can be improved. It can also be that the air stream flowing from the air inlet to the air outlet opening is deflected several times within the housing by the inner walls and/or by corresponding air guiding elements which are arranged in the interior of the house, so that for example a complete air circulation around the individual energy storage components can be achieved.

According to a particularly preferred variant of the invention, it can be provided that a regulating device is provided which can regulate the ambient air stream with the air inlet and outlet openings. Such a regulating device can be for example an adjustable air guiding element that is arranged both in the interior of the housing of the energy storage device or outside of the housing of the energy storage device. Such a regulating device can thus adjust both the air that is entering through the air inlet opening into the housing of the energy storage device as an ambient air stream, as well as the air stream that has already entered through the housing of the energy storage device and that has exited through air outlet opening, for example by pivoting a corresponding air guiding element. In addition, according to the invention there is also the possibility that an element associated with one of the air inlet openings, such as for example a pivotable air guiding element, can be controlled or adjusted independently with the regulating device or with an element that is arranged in the interior of the housing.

In the case of the motor vehicle according to the invention, the regulating device can comprise at least one adjustable blind and/or at least one adjustable flap for closing the air inlet opening and/or air outlet opening, wherein the blind and/or the flap is or are movable between the opening position and the closing position via a control device.

This creates in accordance with the invention the option that a plurality of air inlet openings and/or air outlet openings are provided respectively with a blind or with a flap which close the respective multiple air inlet openings or air outlet openings. However, according to the invention there is also the possibility that several air inlet or air outlet openings can be respectively closed with a separate blind or flap. These multiple blinds of flaps can be controlled separately from a control device. As an alternative or additionally, however, there is also the possibility that specific control signals can be generated by the control device so that the individual blinds and/or flaps can be or are adjusted in predetermined adjustment positions depending on these signals. In addition, fixed air guiding elements can be also arranged so that they are attached to the blinds and/or the flaps, which improve the air guidance in the area of the air inlet opening and/or air outlet opening.

According to the invention, the blind and/or the flap can be arranged so that it is at least partially visible in the area of the front of the motor vehicle. In this case, this is typically the blind and/or flap that is used for closing the air inlet opening. With the arrangement of the blind and/or of the flap directly on the front of the motor vehicle, the blind and/or the flap represent an element which is directly impacted by the ambient air stream, so that the flow resistance coefficient of the motor vehicle can be changed by adjusting the blind and/or the flap from the opening position to the closed position.

Therefore, in particular with a high speed of the motor vehicle, the blind and/or the flap can be controlled with a control device in such a way that the ambient air stream entering the into the housing of the energy storage device is sufficient for the regulation of the temperature of the energy storage component, wherein the blind and/or the flap is or are not completely opened, so that the flow resistance coefficient of the motor vehicle can be modified accordingly.

In this case, in a variant of the invention, at least one air guiding channel is provided which is connected at one end with the housing and at the other end of the air guiding channel is attached the blind and/or flap, for example so that it is arranged in the area of in or at the cooling grill. Therefore, a possibility is created according to the invention that although the blind and/or the flap is arranged in the area of the front of the motor vehicle, the housing of the energy storage device is arranged at a distance from the front of the motor vehicle in the direction of the passenger compartment and connected to the air guiding channel. A higher flexibility is thus achieved in this manner with respect to the entire construction and/or to the exact position for the installation of the energy storage device.

In addition, according to a particularly preferred variant of the invention it can be also provided that the control device is configured for controlling the regulating device as a function of a temperature of the energy storage device and/or of the ambient temperature of the motor vehicle and/or as a function of a driving speed of the motor vehicle and/or as a function of a thermal energy storage model that is stored in the control device. For example, several temperature sensors can be arranged in the housing of the energy storage device in different positions, in particular in positions in which a particularly large heat development of so called hotspots can be expected. In addition or alternatively, it should be also taken into account that one or a plurality of sensors can be used for detecting an ambient temperature of the motor vehicle with the control of the regulating device.

As was already explained above, the control that is exercised with the regulating device and takes place as a function of the driving speed of the motor vehicle can be also used to achieve in particular the best possible relationship between the cooling output of the energy storage device and the flow resistance of the motor vehicle. By means of a thermal energy model, the ambient air stream entering the housing can be for example amplified with a corresponding adjustment of the regulation device already before an actual increase of temperature can be measured in the interior of the housing, whereby the temperature increase of the energy storage components that is caused for example by a request can be on the whole decreased. The storage device model describes for example an increase of temperature of the individual energy storage component as a function of different definable requested driving cycles. This thermal energy storage model can be for example stored in the control device.

In addition, it can be provided according to the invention that the control device is designed for maintaining control depending on the sensor data that is detected by a rain sensor. This means that when precipitation is detected as a function of the sensor data that is detected by the rain sensor, the position of the blind and/or of the flap are adjusted from an open position to a closed position in order to prevent the rain water for example from penetrating through the air inlet opening into the housing of the energy storage device. It can be naturally also provided that the blind and/or the flap are in such a case not closed completely, as long as only a slight precipitation has been detected and the penetration of moisture into the house is therefore in such a case relatively unlikely.

In addition, the invention relates to an energy storage device which is provided with at least one electric energy store and a housing that is equipped with at least one air inlet opening and at least one air outlet opening, wherein ambient air can be guided through the air inlet opening into the housing and through the air outlet opening from the housing for passive cooling. The energy storage device can thus be further developed with the method according to the invention with the described features.

BRIEF DESCRIPTION OF THE DRAWING

Other advantages and details of the invention will be explained next based on two embodiments while taking into account the attached figures. The figures are schematic representations which show the following.

DETAILED DESCRIPTION OF THE DRAWING

Figure 1:
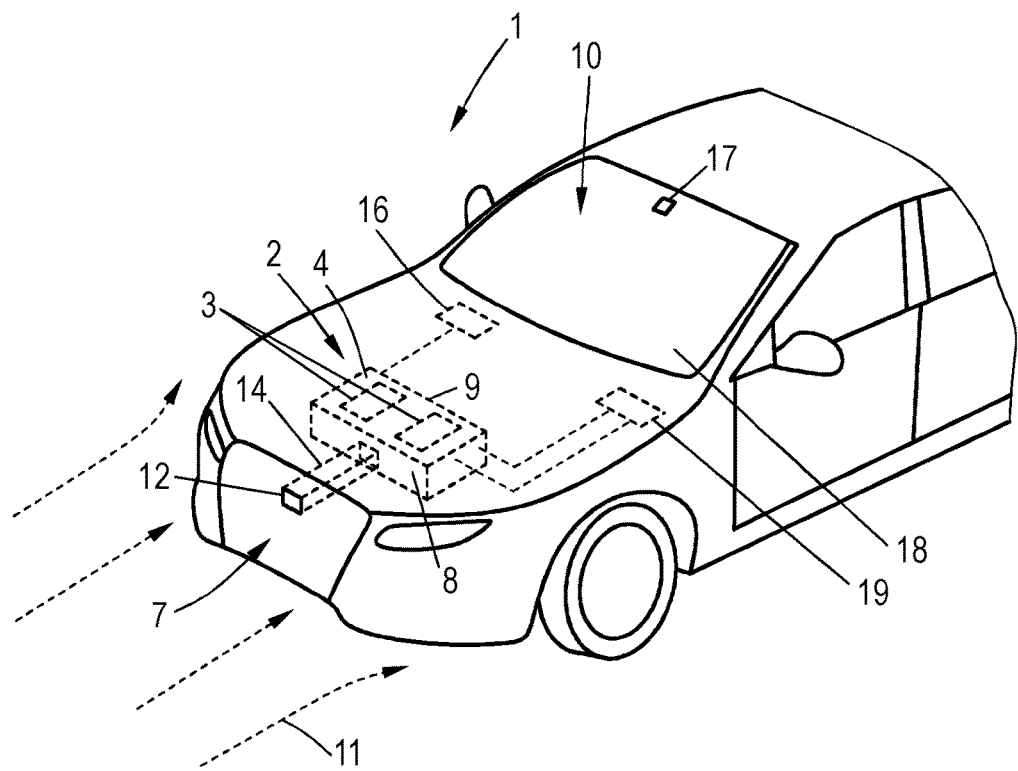
FIG. 1 an embodiment of a motor vehicle according to the invention.

FIG. 1 shows a motor vehicle 1 comprising an energy storage device 2 provided with two electric energy stores 3. The energy stores 3 are accommodated in one housing 4. In the lateral principle illustration of the energy storage device 2 shown in FIG. 2 it is indicated that an air inlet opening 5 and an air outlet opening 6 are provided at the housing 4. While the air inlet opening 5 is arranged at the side 8 oriented toward the motor vehicle front 7, the air outlet opening 6 is arranged at the side 9 of the motor vehicle oriented toward the rear of the motor vehicle (not shown).

Figure 2:
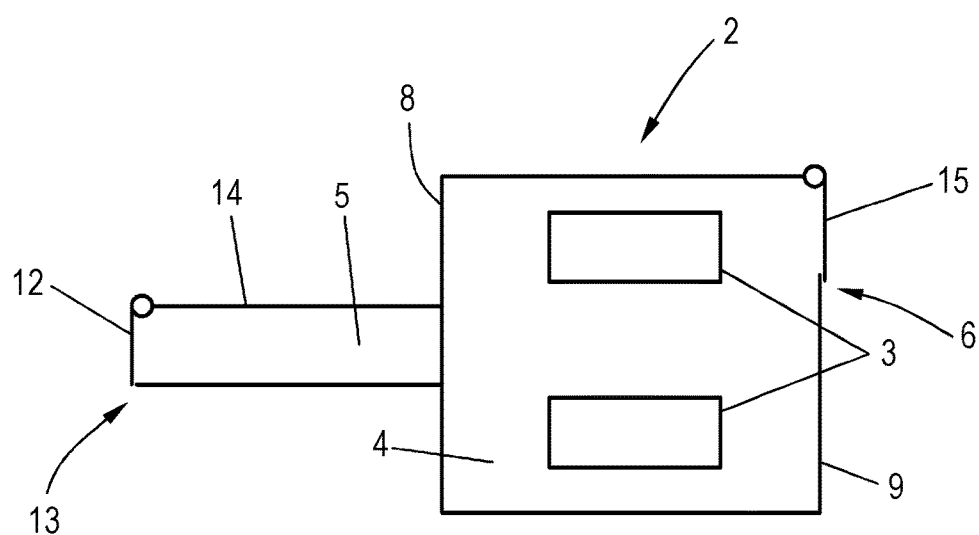
FIG. 2 an illustration of the principle of the energy storage device already shown in FIG. 1 in a lateral view.

The energy storage device 2 is arranged in the area between the motor vehicle 7 and the passenger cell 7. The headwind which is generated by the traveling vehicle and the ambient air 11 impacting the motor vehicle front 7 indicated by the arrows with dashed lines, occur in the illustration shown in FIG. 1 inter alia on a pivotable flap 12 of an adjusting device 13 as the flap 12 is in its closed position. As a result, the flap 12 closes an air guiding channel 14 located behind the flap and thus also the air inlet opening 5 of the housing 4 which is connected with the other end of the air guiding channel 14. Therefore, the proportion of the ambient air 11 that passes through the air inlet opening 5 into the housing 4 can be adjusted. The air outlet opening 6 can be also closed with another pivotable flap 15 of the adjusting device 13 as shown in FIG. 2. The amount of the ambient air stream 11 that passes through the air outlet opening 6 out of the housing 4 can thus be adjusted in this manner. In this embodiment, both pivotable flaps 12, 15 of the adjusting device 13 can be controlled separately from the control device 16. Therefore, at least a portion of the ambient air stream 11 can be controlled individually depending on the respective operating situation with the air inlet opening 5 in the housing 4 of the energy storage device 2, as well as guided through the air outlet opening 6 out of the housing 4.

The pivotable flap 12 is arranged in the area of the motor vehicle 7 in such a way that on the one hand it is visible, while on the other hand, its position can be changed by adjusting the position of the flap 12 from the open position to the closed position of the flow resistance coefficient of the motor vehicle 1, because the ambient air stream 11 is guided with a closed flap 12 through the changed outer form of the motor vehicle in such a way that the pressure resistance that is caused by the ambient air stream is changed at the motor vehicle 7. With the use of an air channel 14, this effect can be used in spite of the fact that the housing 4 of the energy storage device 2 is located in the direction of the passenger cell 10 at a distance from the vehicle front 7.

The control device 16 is in the embodiment shown here configured in such a way that it controls the regulating device 13 with both pivotable flaps 12, 15 as a function of a temperature of the energy storage device 2, as a function of a driving speed of the motor vehicle 1, and as a function of an evaluation performed on the basis of rain sensor data that is detected by the rain sensors arranged on the windshield 18 of the motor vehicle 1. Accordingly, the flap 12, which is arranged in the area of the motor vehicle front 7, is controlled by the control device 16 in such a way that it is pivoted from an opened position into its closed position as a function of an evaluation of the rain sensor data detected by the rain sensor 17 that detects precipitation in the vicinity of the motor vehicle. This therefore insures that for example splashed water will not penetrate into the housing 4 of the energy storage vehicle 2. The rain sensor data is made available by the rain sensor 17 of the control device 16, which is then transmitted by means of a communication bus system (not shown), to which the rain sensor 17 and the control device 16 are connected, to the control device 16.

Figure 3:
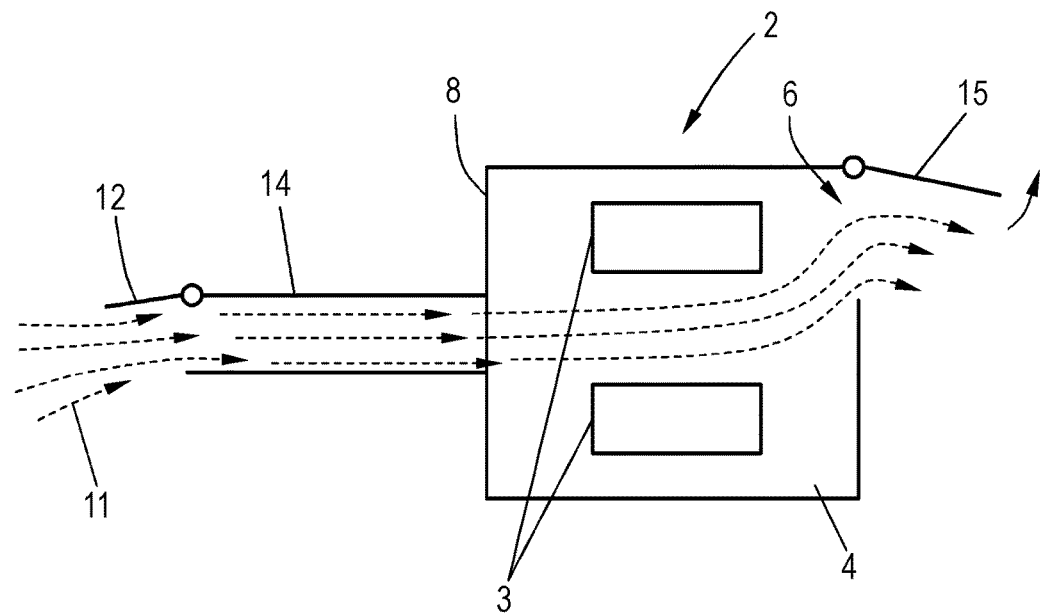
FIG. 3 another illustration of the principle of the energy storage device already shown in FIG. 1 and FIG. 2 in a lateral view.

If the motor vehicle 1 is moving at a speed below a specified limiting speed which was stored in a storage device of the control device 16 during the initial programming of the control device 16, the control device 16 controls only the flap 12 which is arranged in the area of the vehicle front 12 in such a way that it is moved to its closed position. Below the limiting speed, a sufficient cooling output cannot be expected to be generated by an incoming stream of the ambient air. Consequently, the cooling is created, at least in this situation, mainly by the means of the air conditioning device 19, which is also arranged between the vehicle front 7 and the passenger cell 10. Therefore, the air stream that is generated by the air conditioning device 19, or by a fan (not shown) of the air conditioning device 19, is not needlessly deflected in the direction of the air inlet opening 5, for example when the motor vehicle 1 is standing, and the flap 12 is pivoted from an opened position into its closed position. If the motor vehicle 1 is moving with a speed that is greater than the limiting speed stored in the control device 16, and the temperature of the energy storage device exceeds a temperature limiting value that is also stored in the control device 18, while it is determined within the scope of an evaluation of the rain data detected by the rain sensor 17 that there is no precipitation in the area of the motor vehicle 1, both the flap 12 and the flap 15 are pivoted from their closed position to their opened position as shown in FIG. 3. As a result, at least a portion of the ambient air stream 11 can flow through the air guiding channel 14 into the housing 4 of the energy storage device and then emerge through the air outlet opening 5 from the housing 4, having successfully performed the cooling of the energy storage device 3.

Figure 4:
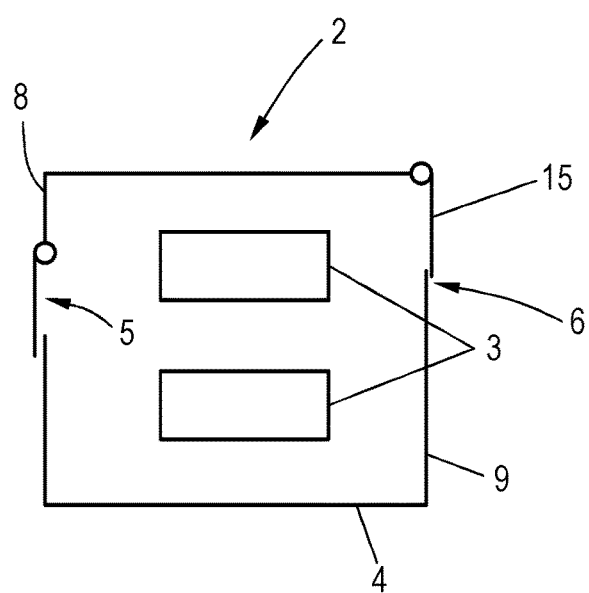
FIG. 4 another embodiment of an energy storage device according to the invention in a lateral view.

FIG. 4 shows an alternative example which uses the same reference symbols to the extent that they fulfill the same technical function. The energy storage device 2 again comprises a housing 4, in which are arranged two energy stores 3, as well as an air inlet opening 5 and an air outlet opening 6. The air outlet opening 6 is similarly to the embodiment described above closed by means of a flap 15 which is mounted on the housing 4. Unlike in the previous embodiment, the flap 12 is also arranged directly on the housing 4 of the energy storage device 2. Accordingly, an air guiding channel is not used in the second embodiment shown in FIG. 4. When such an energy storage device 2 is used for example in the motor vehicle 1, it cannot be arranged at a distance to the vehicle front 7 between the vehicle front 7 and the passenger cell 10 as was the case in the previous embodiment, when the respective movements between a closed position and an opened position are intended to exert an influence on the flow resistance coefficient of the motor vehicle 1.

The invention claimed is:

1. A motor vehicle, comprising:
an energy storage device with at least one electric energy store and an air conditioning device for active regulation of the temperature of the energy store, wherein the energy store is accommodated in a housing, wherein in the housing is provided at least one air inlet opening and at least one air outlet opening, and an ambient air stream can be guided through the air inlet opening into the housing and through the air outlet opening out of the housing for passive cooling,
wherein a regulation device is provided, which regulates the ambient air stream through the air inlet opening and through the air outlet opening,
wherein the regulating device is provided with at least one adjustable flap for closing the air inlet opening and the air outlet opening, wherein the flap is controlled by a control device so that the flap can be moved between an opened position and a closed position, and
wherein the flap is arranged so that the flap is at least partially visible in the area of the motor vehicle front.

2. The motor vehicle according to claim 1, wherein the energy storage device is arranged in an area between a motor vehicle front and a passenger cell, so that the ambient air stream that is generated by the headwind and by the ambient air stream and that is impacting the vehicle front can be guided through the air inlet opening into the housing.

3. The motor vehicle according to claim 2, wherein the air inlet opening is arranged at a side of the housing directed toward the motor vehicle front, and the air outlet opening is arranged at a side of the housing directed toward a rear of the motor vehicle.

4. The motor vehicle according to claim 1, wherein at least one air guiding channel is provided which is connected with one end of the housing, and the flap is attached at another end of the air guiding channel, which is arranged in the area of the motor vehicle front.

5. The motor vehicle according to claim 1, wherein a control device is configured to control the regulating device as a function of a temperature of the energy store and of an ambient temperature of the motor vehicle and as a function of a driving speed of the motor vehicle and as a function of a stored thermal energy storage device model.

6. The motor vehicle according to claim 5, wherein the control device is designed to control the regulating device as a function of the sensor data detected by a rain sensor.

7. An energy storage device, comprising:
at least one electric energy store and a housing having at least one air inlet opening and at least one air outlet opening, wherein an ambient air stream can be guided through an air inlet opening into the housing and through the air outlet opening from the housing for passive cooling,
wherein a regulation device is provided, which regulates the ambient air stream through the air inlet opening and through the air outlet opening,
wherein the regulating device is provided with at least one adjustable flap for closing the air inlet opening and the air outlet opening, wherein the flap is controlled by a control device so that the flap can be moved between an opened position and a closed position, and
wherein the flap is arranged so that the flap is at least partially visible in the area of the motor vehicle front.

8. The energy storage device according to claim 7, wherein a regulating device is provided, which can adjust the ambient air stream by an air inlet opening and an air outlet opening.

9. The energy storage device according to claim 8, wherein the regulating device includes at least one adjustable flap for closing the air inlet opening and the air outlet opening, wherein the flap is controlled so that the flap can be moved between a closed position and an open position by a control device.

10. The energy storage device according to claim 9, wherein the storage device is configured to control the regulating device as a function of at least one of a temperature of the energy store, an ambient temperature, sensor data detected by a rain sensor, and as a function of a thermal energy storage device model stored in the control device.

* * * * *